United States Patent [19]

Ottosen

[11] 4,180,369
[45] Dec. 25, 1979

[54] WIND MILLS

[76] Inventor: Gert O. Ottosen, Frederikssundsvej 25, 3. tv, 2400 Copenhagen NV, Denmark

[21] Appl. No.: 874,619

[22] Filed: Feb. 2, 1978

[30] Foreign Application Priority Data

Feb. 4, 1977 [DK] Denmark .............................. 477/77

[51] Int. Cl.² .............................................. F03D 1/04
[52] U.S. Cl. ........................................... 415/2; 416/9; 416/11; 416/175
[58] Field of Search ........... 416/146 R, 193 R, 193 A, 416/175, 244 R, 9–11; 415/2–4

[56] References Cited

U.S. PATENT DOCUMENTS

| 2,322,763 | 6/1943 | Martino | 416/146 |
| 2,784,556 | 3/1957 | Perdue | 416/9 X |
| 4,018,543 | 4/1977 | Carson et al. | 415/2 |

FOREIGN PATENT DOCUMENTS

| 512909 | 11/1930 | Fed. Rep. of Germany | 415/2 |
| 827487 | 4/1938 | France | 416/11 |
| 943749 | 3/1949 | France | 416/11 |
| 1237548 | 6/1960 | France | 415/2 |

Primary Examiner—Everette A. Powell, Jr.
Attorney, Agent, or Firm—Lawrence E. Laubscher

[57] ABSTRACT

A wind mill construction is disclosed, including a rigid tower structure (6, 7) to the upper end of which is connected for rotation about a vertical axis a wind turbine housing (5) to which is journalled for rotation about a horizontal axis a propeller (2) of the two-blade on three-blade type, characterized in that a strip member (8) extends generally helically about the tower structure for counteracting the effects of wind upon the tower and the blades. The strip may be mounted on the upper portion of a tower the base portion of which has a frustoconical configuration. The pitch of the helical strip is preferably no greater than three times the maximum diameter of the upper tower portion.

11 Claims, 3 Drawing Figures

WIND MILLS

BRIEF DESCRIPTION OF THE PRIOR ART

The present invention relates to improvements on wind mills.

In the last years, the efforts in utilizing the wind as a power source have been strongly increased. During the search it has been found that from an economical point of view the best results are achieved by means of a wind turbine driven by a two-bladed or a three-bladed propeller rotating on a mainly horizontal axis which through a transmission comprising a gear box is coupled to a generator.

The wind turbine is rotatably mounted at the top of a tower construction. The heights of such tower constructions ranger from 30 meters and up to at least 100 meters, and the lengths of the propeller blades are usually about 60 percent of the tower height.

As the tower has to carry the rather heavy wind turbine with propellers and moreover has to be capable of withstanding the wind pressure on the propeller blades, the tower must be constructed as a rigid structure.

Some wind turbines have been adapted to work upwind the tower, whereas others have been adapted to work downwind.

In both cases, however, it has been experienced that the tower causes what has been called a shadow effect. This effect is caused by the fact that the wind before reaching the tower is split up into two streams, one flowing on one side of the tower and the other on the other side. This again means that when the propeller blades rotate, the blade passing this shadow zone will be exposed to wind forces quite dissimilar to the wind forces which act upon the propeller blades outside the shadow zone. The result is the development of an oscillation or vibration of the propellers.

Through proper design of the propeller blades and through the selection of suitable materials, the detrimental effect on the blades as such by this oscillation or vibration can be counteracted, but up to now, nobody has suggested how to counteract this effect on the blade roots and the hub.

Tests have been performed with downwind wind turbines with the purpose of studying if and how the shadow effect or the influence of this effect could be reduced. It was found that the shadow effect could be somewhat reduced by using a lattice work tower construction, and the best results were obtained if all members of the lattice work construction were tubular members.

However, it was also found that the shadow effect varied with the direction of the wind. This is caused by the fact that in a lattice work tower there will be horizontal members, vertical members, and crossing members.

It has also been suggested to use a tower construction having a basis which supports a tower portion, the cross-section of which is streamlined (i.e. drop-shaped), said tower portion carrying the wind turbine. When the wind meets the curved front part of such a tower portion, the shadow effect at its back will be considerably reduced. In the open, however, the wind never blows in one definite direction, but in directions pendulating relative to the main direction, and thus the shadow effect will constantly vary. Furthermore, the streamlined tower section must be rotatable so that when the wind changes, it can be adjusted to the main wind direction.

SUMMARY OF THE INVENTION

The aim of the invention is to solve the problem of reducing the detrimental effect on the propellers of towers which at their top in turnable arrangement carry a wind turbine with a two bladed or a three bladed propeller mounted on a substantially horizontal axis.

The invention proposes an improved wind mill where first of all the risk of a fatigue fracture in the roots of the propeller and in the hub is reduced to a minimum, and where also the wear on the bearings of the propeller axis is reduced. Other advantages will be apparent to anybody skilled in the art through the detailed description following below.

The wind mill according to the invention comprises a tower construction carrying on its top in turnable arrangement a wind turbine with a two-bladed or three-bladed propeller attached to a substantially horizontal axis, plate strip members being mounted on the tower in helical course with their free edges extending from the tower.

The plate strip members may be connected to form one continuous helical winding. In certain cases, however, they may be arranged as spaced sector members, the faces of which form an interrupted helical winding.

The plate strip members are mounted to the tower construction in a manner known per se.

When the surface of the tower is smooth, the plate strip members are mounted extending directly from this surface.

If the tower is a lattice construction, a mantle of a circular cross-section is equipped enveloping the lattice work at least at the portion of the tower where the helical winding is mounted.

The pitch of the helical formed by the plate strip members may be constant or variable. Preferably, the pitch is less than or equal to $3 \times D$, wherein D is the maximum diameter of the tower portion to be provided with the helical winding. When used on a tower with a circular cylindrical section of a diameter d, a pitch of $2\pi\sqrt{3}/3 \times d$ is preferred.

BRIEF DESCRIPTION OF THE DRAWING

The invention will be further understood from the accompanying drawings, which show embodiments of wind mills according to the invention and wherein.

DETAILED DESCRIPTION

Figure 1:
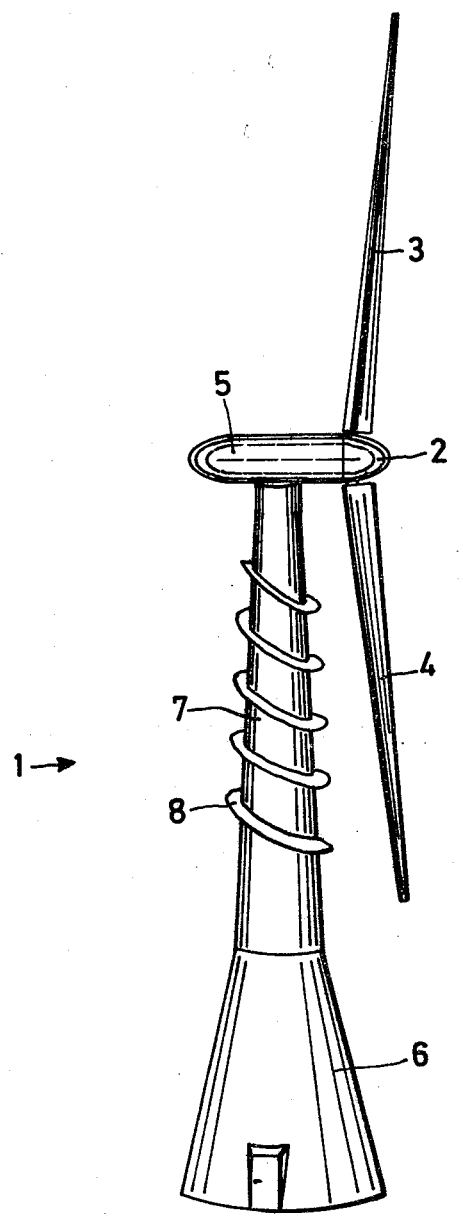
FIG. 1 is a sideview of a wind mill where the wind turbine is mounted on a rigid tapered tower.

In FIG. 1 the wind mill 1 comprises a rigid tapered tower having a basis section 6 and an upper section 7. On the top of the upper section 7 is mounted a wind turbine comprising a housing 5 which carries a propeller arrangement 2 with two propeller blades 3 and 4, respectively. The propeller arrangement is as known per se attached to a horizontal axis which is supported in bearings in the housing 5. The axis is coupled to a gear box through which the rotation speed of the propeller axis is increased at a ratio of about 1:50 to the output axis of the gear which then through coupling means rotates a generator.

The housing 5 containing the equipment just described is rotatably mounted on the top of the tower. When the propeller is driven by the wind in downwind position, the housing will be turned in the appropriate position by the wind thrust on the propeller. A helical winding made of plate strips is mounted on the tower portion 7. The plate strips are connected to form a continuous helix extending from the tower section 7 in the length of each of the propeller blades. The helix will catch the wind and force a wind flow to the leeside of the tower. This flow will counteract the vibrations of the propeller blades when they during their rotation pass the tower.

The good effect of the helix can be established in a simple way. During its rotation the propeller will always develop a certain droning sound. By a wind mill without the helix this droning will vary in tone. When a helix is equipped, this droning sound will become more constant in tone.

Figure 2:
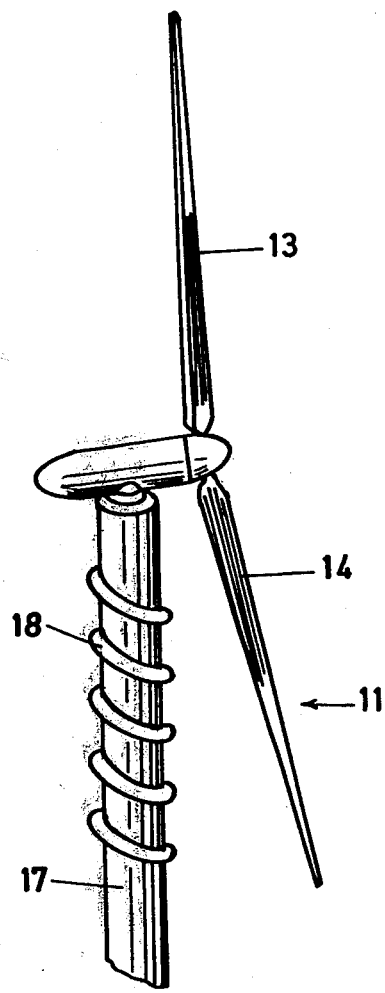
FIG. 2 is a sideview of a wind mill where the wind turbine is mounted on a rigid circular cylindrical tower portion.

In FIG. 2 only the upper portion of a wind mill 11 is shown. 17 is a rigid pillar which at its top carries a wind turbine. The wind turbine is quite similar to the one shown in FIG. 1 and is mounted rotatably on the top, however, with rotation axis of the propeller blades 13 and 14 slightly inclined relatively to horizontal. 18 is a helix similar to the helix 8 of FIG. 1.

Figure 3:
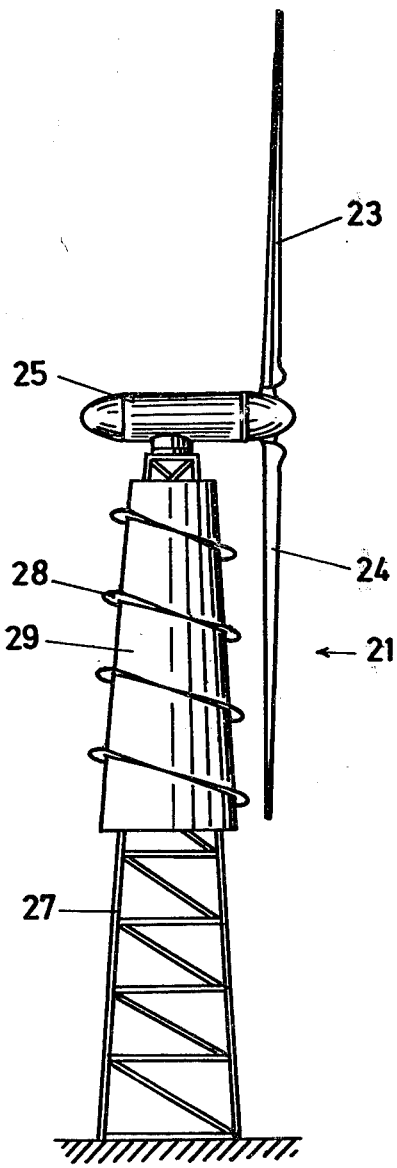
FIG. 3 is a sideview of a wind mill where the wind turbine is mounted on a lattice work construction.

In FIG. 3 a wind mill 21 is schematically shown. 27 is a lattice work tower which carries the wind turbine rotatably mounted at its top. The housing 25 is similar to the housing 5 of FIG. 1. The rotation axis for the propeller blades 23 and 24 is horizontal. In a length approximately corresponding to the length of the propeller blades the tower is provided with a jacket 29 and this jacket carries the helix 28.

What I claim is:
1. A wind mill, comprising
   (a) a vertical rigid tower (6,7);
   (b) a wind turbine (5) connected with the upper end of said tower for rotation about a vertical axis;
   (c) a propeller (2) connected with the wind turbine for rotation about a horizontal axis, said propeller having at least two blades; and
   (d) strip means (8) generally rectangular cross-sectional configuration extending generally helically about at least the upper portion of said tower, the longitudinal edges of said strip means being adjacent and remote from said tower, respectively, thereby to reduce the effects of the wind on the tower and on the propeller blades.
2. Apparatus as defined in claim 1, wherein said strip means comprises a single continuous member.
3. Apparatus as defined in claim 1, wherein said strip means includes a plurality of strip members mounted in spaced relation to define an interrupted helical path.
4. Apparatus as defined in claim 1, wherein said strip means includes a plurality of strip members arranged to define from 1 to 3 helical courses.
5. Apparatus as defined in claim 1, wherein the portion of the tower surface opposite the propeller blades has a smooth external surface.
6. Apparatus as defined in claim 2, wherein the pitch of the helical strip member is constant.
7. Apparatus as defined in claim 1, wherein the pitch of said helical strip member increases longitudinally of the tower.
8. Apparatus as defined in claim 1, wherein the pitch of said helical strip means in no greater than $3 \times D$, where D is the maximum diameter of the lower end of the helical strip means.
9. Apparatus as defined in claim 1, wherein the portion (17) of the tower opposite the propeller blades comprises a circular cylinder, and further wherein the pitch of the helical strip member is $2\pi\sqrt{3}/3 \times d$, where d is the diameter of the cylindrical surface.
10. Apparatus as defined in claim 1, wherein the direction of the helical turns of said strip means corresponds with the direction of rotation of said propeller means.
11. Apparatus as defined in claim 1, wherein the direction of the helical turns of said strip means is opposite to the direction of rotation of said propeller means.

* * * * *